July 28, 1925.

H. D. MOORE ET AL 1,547,512

ROAD RING ATTACHMENT FOR TRACTION WHEELS

Filed April 2, 1925

Inventors
H. D. Moore
W. C. Fry

By T. N. Bryant
Attorney.

Patented July 28, 1925.

1,547,512

UNITED STATES PATENT OFFICE.

HENRY D. MOORE AND WILLIAM C. FRY, OF HUBBARD, OREGON.

ROAD-RING ATTACHMENT FOR TRACTION WHEELS.

Application filed April 2, 1925. Serial No. 20,168.

*To all whom it may concern:*

Be it known that we, HENRY D. MOORE and WILLIAM C. FRY, citizens of the United States of America, residing at Hubbard, in the county of Marion and State of Oregon, have invented certain new and useful Improvements in Road-Ring Attachments for Traction Wheels, of which the following is a specification.

This invention relates to road ring attachment for traction wheels.

The primary object of this invention is to provide a ring structure capable of being used on traction wheels having traction increasing lugs, ribs, or other projecting elements, such as those formed on tractor wheels, which would damage city roadbeds or pavements, for preventing the lugs or ribs from engaging said roadbeds while traveling thereover; said ring structure being capable of being quickly and easily made inoperative without necessitating the removal of the same from the wheel.

Other objects and advantages of the invention will be apparent during the course of the following description.

Figure 1:
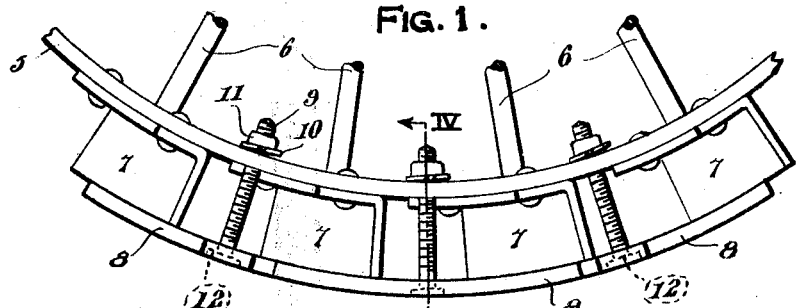
Figure 2:
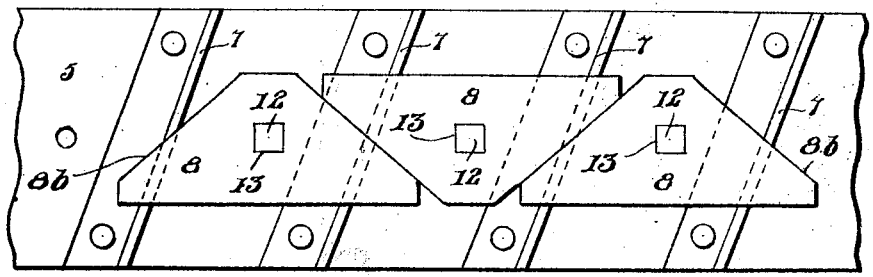
Figure 3:
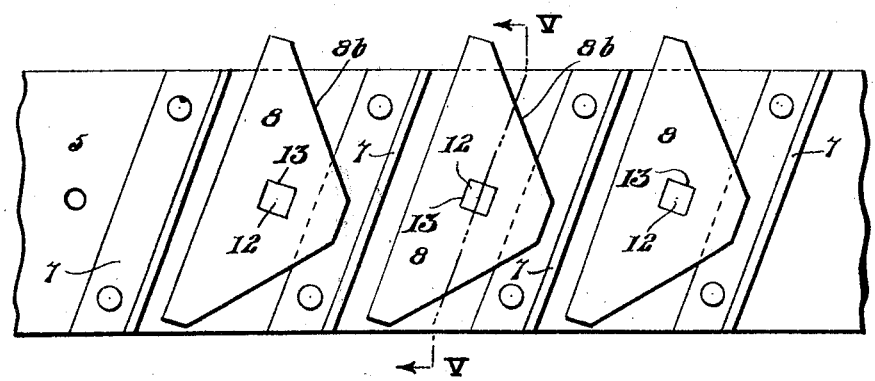
Figure 4:
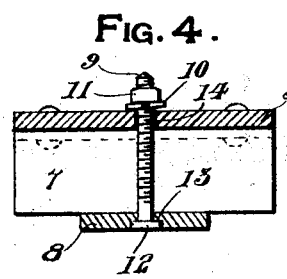
Figure 5:
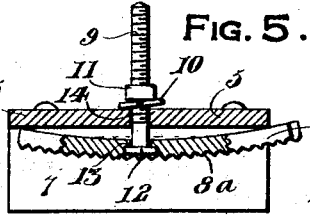

In the accompanying drawings forming a part of this specification and in which like numerals are employed to designate like parts throughout the same, Figure 1 is a fragmentary side elevational view of a traction wheel equipped with the road ring structure embodying this invention, Figure 2 is a bottom plan view of the structure shown in Fig. 1, and further illustrates the road ring in its operative position, Figure 3 is a similar view to Fig. 2 but illustrates the road ring in its inoperative position, Figure 4 is a transverse sectional view taken upon line IV—IV of Fig. 1, and Figure 5 is a transverse sectional view taken upon line V—V of Fig. 3.

In the drawings, wherein for the purpose of illustration is shown a preferred embodiment of this invention, the numeral 5 designates the tread portion of a wheel having any conventional form of supporting means, such as the spokes 6. This tread portion 5, in many conventional forms of traction wheels, such as those used on tractors, is provided with a plurality of traction increasing elements 7, which may be in the form of lugs, ribs, or any other suitable elements which will project from the periphery of the tread portion 5.

The road ring attachment embodying this invention consists of a plurality of similar, substantially triangularly-shaped segments 8 which are slightly curved longitudinally, as best illustrated in Figs. 1 and 5. Each one of these ring segments is provided with an independent fastening means which may be in the form of a bolt 9 having a spring washer 10 and a nut 11 suitably mounted thereon. These fastening bolts 9 are intended to be provided with squared heads 12 receivable within similarly-shaped countersunk portions 13 formed in the said segments and project through suitable openings 14 in the tread portion 5 of the traction wheel. It will be noted by inspecting Figs. 1 to 3 inclusive that the ring segments are positioned one between each adjacent pair of traction increasing elements 7. The convex surfaces of these ring segments may be formed perfectly plain or smooth, as illustrated in Figs. 1 to 4 inclusive or may be roughened or corrugated as designated at $8^a$ in Fig. 5.

The operation of this road ring attachment may be described as follows:—

To form the ring illustrated in Figs. 1 and 2, with the segments cooperating with each other to protect the traction increasing elements 7 for preventing them from damaging a city roadbed, or the like while traveling over the same, the segments 8 are arranged as best illustrated in Fig. 2 with their angularly arranged end edges $8^b$ engaging each other. The nuts 11 should then be tightened upon the bolts 9 for clamping the segments 8 against the outer edges of the traction increasing elements 7.

To uncover the traction increasing elements 7, or for permitting the same to be used while the traction wheel is traveling over soft ground, the nuts 11 should be loosened upon the bolts 9 for permitting the segments 8 to be partially turned for allowing them to be moved radially inwardly of the traction wheel to be arranged between adjacent pairs of traction elements and in engagement with the tread portion 5 of the traction wheel. The nuts 11 may then be tightened upon the bolts 9 for retaining the ring segments 8 in the positions illustrated in Figs. 3 and 5.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:—

1. In a device of the type described, the combination with a wheel having spaced traction increasing elements projecting from its periphery, of a segmental ring structure continually carried by said wheel and capable of being arranged to protect or expose said traction increasing elements.

2. In a device of the type described, the combination with a wheel having spaced traction increasing elements projecting from its periphery, of a plurality of segments carried by said wheel, said segments being capable of being arranged to lie between the traction increasing elements to expose the same or of being arranged to form a continuous ring to protect the same.

3. In a device of the type described, the combination with a wheel having spaced traction increasing elements projecting from its periphery, of a plurality of curved segments carried by said wheel, said segments being capable of being arranged to lie one between each adjacent pair of traction increasing elements to expose the same or of being arranged to form a continuous ring outwardly of said elements to protect the latter.

4. In a device of the type described, the combination with a wheel having spaced traction increasing elements projecting from its periphery, of a plurality of curved segments carried by said wheel, said segments being capable of being arranged to lie one between each adjacent pair of traction increasing elements to expose the same or of being arranged to form a continuous ring outwardly of said elements to protect the latter, and further being of similar, substantially triangular-shape, and means for independently fastening the segments to said wheel.

5. In a device of the type described, the combination with a wheel having spaced traction increasing elements projecting from its periphery, of a plurality of curved segments carried by said wheel, said segments being capable of being arranged to lie one between each adjacent pair of traction increasing elements to expose the same or of being arranged to form a continuous ring outwardly of said elements to protect the latter, and further being of similar, substantially triangular-shape, and a bolt and nut structure for independently fastening each segment to said wheel.

In testimony whereof we affix our signatures.

HENRY D. MOORE.
WILLIAM C. FRY.